US007050906B2

(12) United States Patent
Hathiram et al.

(10) Patent No.: US 7,050,906 B2
(45) Date of Patent: May 23, 2006

(54) SYSTEM FOR MONITORING AND LOCATING PEOPLE AND OBJECTS

(75) Inventors: Daraius Hathiram, Austin, TX (US); Bruce Cummings, Austin, TX (US); Nicholas Anderson, Austin, TX (US); Ronald E. Ham, Austin, TX (US); James Chaput, Austin, TX (US)

(73) Assignee: Bluespan Inc., Austin, TX (US)

( * ) Notice: Subject to any disclaimer, the term of this patent is extended or adjusted under 35 U.S.C. 154(b) by 0 days.

(21) Appl. No.: 10/865,528

(22) Filed: Jun. 10, 2004

(65) Prior Publication Data

US 2004/0260463 A1 Dec. 23, 2004

Related U.S. Application Data

(60) Division of application No. 10/644,152, filed on Aug. 20, 2003, now Pat. No. 6,778,902, which is a continuation-in-part of application No. 10/224,643, filed on Aug. 20, 2002, now abandoned.

(51) Int. Cl.
*G01C 21/00* (2006.01)

(52) U.S. Cl. ........................................ 701/207; 340/500

(58) Field of Classification Search ................ 701/207, 701/1, 200; 340/5.8, 573.4, 5.85, 573.1, 340/10.1, 500, 505, 506

See application file for complete search history.

(56) References Cited

U.S. PATENT DOCUMENTS

| | | | | |
|---|---|---|---|---|
| 4,884,208 A | | 11/1989 | Marinell et al. | 364/460 |
| 5,289,163 A | | 2/1994 | Perez et al. | 340/539 |
| 5,471,404 A | | 11/1995 | Mazer | 364/516 |
| 5,537,102 A | * | 7/1996 | Pinnow | 340/5.8 |
| 5,590,133 A | | 12/1996 | Billstrom et al. | 370/349 |
| 5,594,425 A | | 1/1997 | Ladner et al. | 340/825.06 |
| 5,603,094 A | | 2/1997 | Greear, Jr. | 455/66 |
| 5,621,417 A | | 4/1997 | Hassan et al. | 342/457 |
| 5,640,146 A | | 6/1997 | Campana, Jr. | 340/573 |
| 5,642,303 A | | 6/1997 | Small et al. | 364/705.05 |
| 5,650,769 A | | 7/1997 | Campana, Jr. | 340/573 |
| 5,650,770 A | | 7/1997 | Schlager et al. | 340/573 |
| 5,652,570 A | | 7/1997 | Lepkofker | 340/573 |
| 5,694,428 A | | 12/1997 | Campana, Jr. | 375/260 |
| 5,714,932 A | | 2/1998 | Castellon et al. | 340/539 |
| 5,714,937 A | | 2/1998 | Campana, Jr. | 340/573 |
| 5,722,059 A | | 2/1998 | Campana, Jr. | 455/226.2 |
| 5,742,644 A | | 4/1998 | Campana, Jr. | 375/316 |
| 5,748,103 A | | 5/1998 | Flach et al. | 340/870.07 |

(Continued)

*Primary Examiner*—Yonel Beaulieu
(74) *Attorney, Agent, or Firm*—Jerry M. Keys; Robert A. Voigt, Jr.; Winstead Sechrest & Minick P. C.

(57) ABSTRACT

A method, computer program product and system for monitoring and locating an object using secure communications without relying on GPS. A monitoring device may activate a monitored unit (unit monitored by monitoring device) by transmitting a seed of an algorithm and a time synchronization to the monitored unit. The seed and time synchronization may be used in conjunction with an algorithm, e.g., frequency hopping table, stored in both the monitoring device and the monitored unit, to allow both the monitoring device and the monitored unit to communicate with one another at a uniquely synchronized time and frequency thereby making it more difficult for a third party to locate the monitored unit. An alert may be generated when the monitored unit is located beyond a predetermined zone. The monitored unit may be located by activating a directional antenna in conjunction with a digital compass on the monitoring device.

3 Claims, 10 Drawing Sheets

U.S. PATENT DOCUMENTS

| | | | | |
|---|---|---|---|---|
| 5,751,773 | A | 5/1998 | Campana, Jr. | 375/346 |
| 5,857,433 | A | 1/1999 | Files | 119/720 |
| 5,900,818 | A | 5/1999 | Lemnell | 340/573.3 |
| 5,914,671 | A | 6/1999 | Tuttle | 340/825.54 |
| 5,952,958 | A | 9/1999 | Speasl et al. | 342/357 |
| 5,973,601 | A | 10/1999 | Campana, Jr. | 375/346 |
| 5,987,421 | A | 11/1999 | Chuang | 705/7 |
| 6,075,458 | A | 6/2000 | Ladner et al. | 340/825.49 |
| 6,127,917 | A | 10/2000 | Tuttle | 340/10.1 |
| 6,169,484 | B1 | 1/2001 | Schuchman et al. | 340/573.1 |
| 6,169,485 | B1 | 1/2001 | Campana, Jr. | 340/573.4 |
| 6,169,494 | B1 | 1/2001 | Lopes | 340/825.49 |
| 6,236,365 | B1 | 5/2001 | LeBlanc et al. | 342/457 |
| 6,246,376 | B1 | 6/2001 | Bork et al. | 342/460 |
| 6,249,252 | B1 | 6/2001 | Dupray | 342/450 |
| 6,297,768 | B1 | 10/2001 | Allen, Jr. | 342/357.1 |
| 6,300,903 | B1 | 10/2001 | Richards et al. | 342/450 |
| 6,337,628 | B1 | 1/2002 | Campana, Jr. | 340/573.4 |
| 6,459,888 | B1 | 10/2002 | Clark | 455/266 |
| 6,492,906 | B1 * | 12/2002 | Richards et al. | 340/573.4 |
| 6,563,427 | B1 | 5/2003 | Bero et al. | 340/573.1 |
| 6,600,418 | B1 | 7/2003 | Francis et al. | 429/27 |

* cited by examiner

SYSTEM FOR MONITORING AND LOCATING PEOPLE AND OBJECTS

CROSS REFERENCE TO RELATED APPLICATION

The present application is a divisional application of U.S. patent application Ser. No. 10/644,152, entitled "System for Monitoring and Locating People and Objects," filed Aug. 20, 2003, now U.S. Pat. No. 6,778,902, which is a continuation-in-part of U.S. patent application Ser. No. 10/224,643, entitled "A Directional Finding System Implementing A Rolling Code," filed Aug. 20, 2002 now abandoned, which are incorporated by reference herein. The present application claims priority benefits to U.S. patent application Ser. Nos. 10/644,152 and 10/224,643 under 35 U.S.C. §121.

TECHNICAL FIELD

The present invention relates to the field of locating systems, and more particularly to a monitoring and locating system implementing secure communications between the monitoring device and the monitored unit to lessen the ability of a third party locating the object, e.g., person, automobile, attached to the monitored unit.

BACKGROUND INFORMATION

There are numerous methods and systems for locating moveable objects such as automobiles, pets and people. One such system for locating moveable objects, such as a person, utilizes a Global Positioning Sensor (GPS) locator device that may be attached to the object, e.g., carried by the person. The GPS locator device may receive and triangulate signals from each of three or more geostationary satellites and determine the geographical coordinates of the device's current location. The geographical coordinates may be made available to an individual via a web site by the GPS locator device transmitting the GPS coordinates to either a device monitoring the GPS locator device or to a centralized location. However, GPS locator devices may not be able to receive and triangulate signals because the signals may be blocked or scattered by a variety of objects such as dense tree canopies, heavy clouds, metal roofs, layers of rock, concrete or canyon walls. For example, GPS locator devices may not be able to receive and triangulate signals in or around buildings or homes or in the woods with lots of vegetation. Hence, GPS may be of no assistance in locating an object in certain environments as discussed above. Further, in order for the GPS locator device to include both the capabilities of determining the geographical coordinates of the device's current location and transmitting that information to another device or centralized location, the GPS locator device becomes bulky and costly to implement.

One system that does not utilize GPS to locate objects, such as children, uses a monitoring device configured to monitor the position of a child by detecting the signal strength of a radio frequency carrier from a transmitter attached to the child. If the signal of the radio frequency carrier is too weak, the child is too far away from the adult who has the monitoring device. When this happens, the adult is informed that the child has wandered too far away through the use of an audio tone or through the use of vibrations coming from the device. Once the adult is notified that the child is too far away, the device also has a locating display for indicating the relative direction of the child with respect to the adult. However, since the transmitter worn by the child simply transmits a signal with no unique identification code at a particular frequency, a third party, e.g., potential abductor, may be able to intercept the signal and with a similar monitoring device track the child. Furthermore, since the transmitter worn by the child simply transmits a signal with no unique identification code at a particular frequency, a third party, e.g., potential abductor, may be able to transmit false information to the monitoring device.

Therefore, there is a need in the art for a monitoring and locating system that does not rely upon GPS and provides secure communication making it more difficult for a third party, e.g., potential abductor, potential thief, to be able to locate the object, e.g., child, automobile, as well as transmit false information to the monitoring device and/or monitored unit.

SUMMARY

The problems outlined above may at least in part be solved in some embodiments of the present invention by the monitoring device transmitting a seed of an algorithm and a time synchronization to the monitored unit which will be used in conjunction with an algorithm, e.g., frequency hopping table, stored in both the monitoring device and the monitored unit, to communicate at a particular time and frequency between one another. Time synchronization may refer to the time the monitoring device transmits the seed. Each subsequent transmission from the monitored unit to the monitoring device is in a specific time slot, synchronized with the monitoring device and at a frequency that changes pseudo-randomly. A response from the monitoring device resynchronizes the time slot. A seed may refer to a multiple bit number, e.g., 16-bit number, used in conjunction with these time slots to select a particular frequency stored in the algorithm, e.g., frequency hopping table. Hence, the frequency of each communication between the monitoring device and the monitored unit changes according to the algorithm stored in both the monitoring device and the monitored unit thereby making it more difficult for a third party, e.g., potential abductor, potential thief, to be able to locate the object, e.g., child, automobile, as well as transmit false information to the monitoring device and/or monitored unit.

In one embodiment of the present invention, a method for monitoring and locating an object, e.g., person, automobile, may comprise the step of activating a unit to be monitored by a monitoring unit. The method may further comprise receiving a first packet of data form the monitored unit where the first packet of data comprises an identification. The method may further comprise transmitting a seed of an algorithm to the monitored unit if the identification associated with the first packet of data is a valid identification. The method may further comprise measuring a signal strength of a second packet of data if the second packet of data was received at an expected frequency from the monitored unit. The measured signal strength of the second packet of data indicates an approximate distance the monitored unit is located from the monitoring device.

In another embodiment of the present invention, a system may comprise a monitored unit attached to an object. The monitored unit may comprise a memory unit operable for storing a computer program product operable for determining if the monitored unit has been tampered with. The monitored unit may further comprise a processor coupled to the memory unit. The monitored unit may further comprise an emitter coupled to the processor where the emitter is configured to emit infrared signals to the skin of an individual. The monitored unit may further comprise a detector coupled to the processor where the detector is configured to receive reflections of the emitted infrared signals from the skin. The processor, responsive to the computer program, may comprise circuitry operable for determining if an intensity of the reflections of the emitted infrared signals is less than a threshold. The processor may further comprise circuitry operable for transmitting an indication that the monitored unit has been tampered with if the intensity of the reflections of the emitted infrared signals is less than the threshold.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
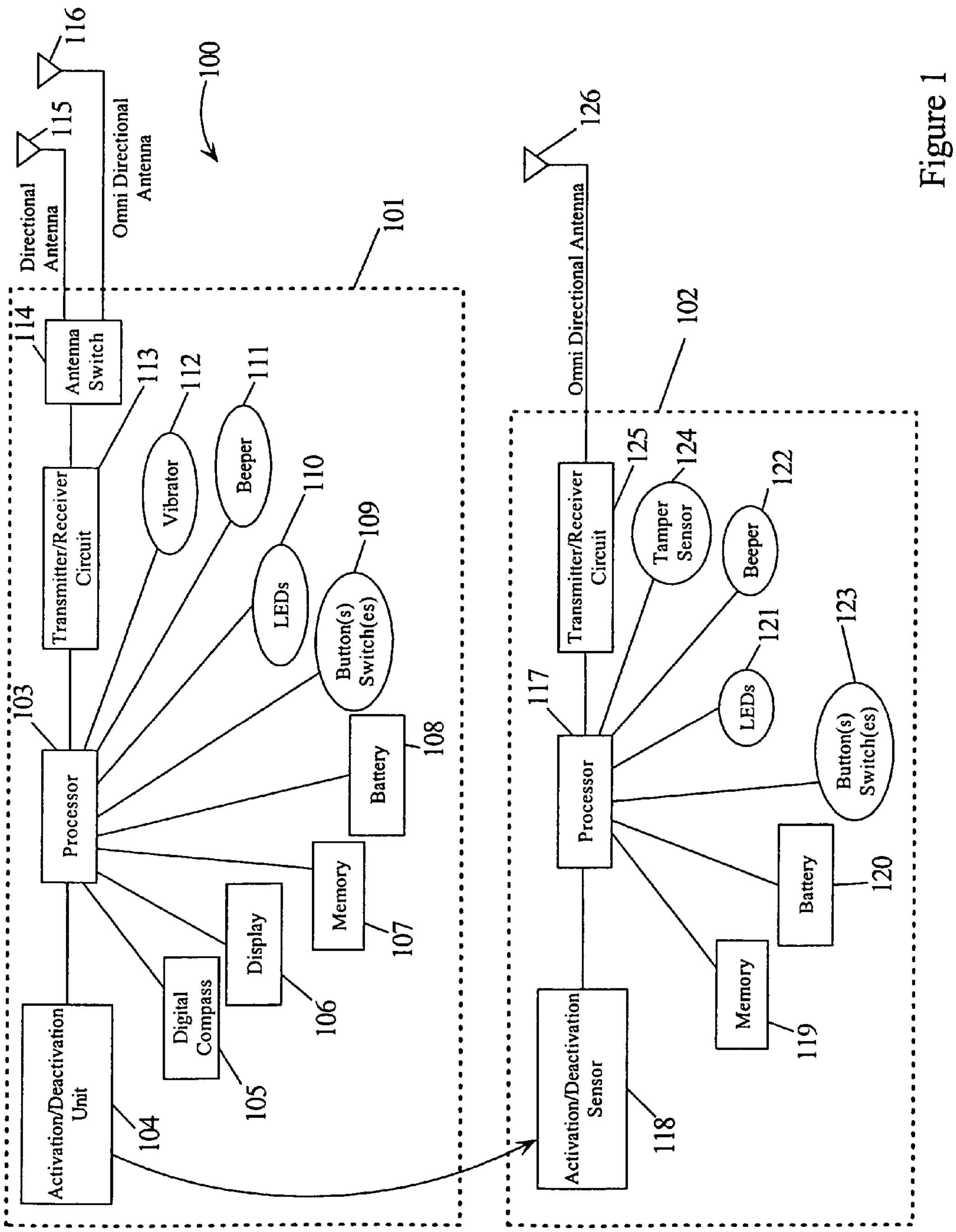
FIG. 1 illustrates an embodiment of the present invention of a system for monitoring and locating an object.

FIG. 1—System for Monitoring and Locating an Object

FIG. 1 illustrates one embodiment of a system 100 not relying upon GPS for locating an object, e.g., person, automobile, baby carriage. Referring to FIG. 1, system 100 may comprise a monitoring device 101 configured to monitor one or more units 102, e.g., wristband type of device worn by a child, attached to one or more objects. In one embodiment, monitoring device 101 may be configured to monitor unit 102 at a distance between 300 to 1,000 feet. It is noted that monitoring device 101 may be configured to monitor unit 102 attached to any type of object.

Returning to FIG. 1, monitoring device 101 may comprise a processor 103 coupled to an activation/deactivation unit 104, a digital compass 105, a display 106, e.g., liquid crystal display, a memory 107, a battery 108, button(s) and/or switch(es) 109, Light Emitting Diode(s) (LEDs) 110, a beeper 111, a vibrator 112, and a transmitter/receiver circuit 113. Transmitter/receiver circuit 113 may be coupled to an antenna switch 114 which may be coupled to a directional antenna 115 and an omni directional antenna 116. It is noted that monitoring device 101 may comprise other and/or additional circuitry providing the same functionality as discussed herein and that FIG. 1 is illustrative.

Referring to FIG. 1, memory 107, e.g., non-volatile memory, may be configured to store a program to perform the steps of the method for activating unit 102 as described further below in conjunction with FIG. 2. Further, the program stored in memory 107 may include an algorithm used to implement frequency hopping as described further below. Further, the program stored in memory 107 may perform the steps of the method for monitoring monitored unit 102 as described further below in conjunction with FIG. 3. Further, the program stored in memory 107 may perform the steps of the method for locating the monitored unit in the locate mode of operation as described further below in conjunction with FIG. 6. Further, the program stored in memory 107 may perform the steps of informing the user of unit 102 to return to "base" as described further below in conjunction with FIG. 9. Further, the program stored in memory 107 may perform the steps of deactivating unit 102 as described further below in conjunction with FIG. 10. Processor 103 may be configured to execute the instructions of the program listed above. It is noted that the steps of the methods performed by the program mentioned above may in an alternative embodiment be implemented in hardware such as in an Application Specific Integrated Circuit (ASIC).

Returning to FIG. 1, as stated above, processor 103 may be coupled to a activation/deactivation unit 104. Activation/deactivation unit 104 may be configured to transmit a signal indicating to unit 102 to enter either an activation mode or a deactivation/sleep mode. Activation mode may refer to a mode in which unit 102 is able to both receive and transmit data to monitoring device 101. Deactivation/sleep mode may refer to a power saving mode of operation in which unit 102 is only able to receive data from monitoring device 101. In one embodiment, activation/deactivation unit 104 may be configured to transmit the signal over a very short range, e.g., inches, thereby preventing other units 102 in close proximity to monitoring device 101 from accidentally being activated. A discussion of activating or deactivating unit 102 is provided further below.

Digital compass 105 may be used in the "locate mode" of operation, as discussed in further detail below in conjunction with FIGS. 3–6, which may be configured to determine the direction of a received signal transmitted from unit 102. An example of a digital compass 105 is the HMC 1052 manufactured by Honeywell™ International (Honeywell™ International is located at 101 Columbia Road, P.O. Box 4000, Morristown, N.J. 07962). The directional information of a received signal may be displayed to a user of monitoring device 101 via display 106.

Battery 108 may supply the necessary operating power for the circuitry and components of monitoring device 101. Battery 108 may be a standard carbon or lithium battery, or a rechargeable type battery such as nickel metal hydride (NiMH), nickel cadmium (NiCAD) or lithium-ion.

Monitoring device 101 may comprise input/output devices such as button(s)/switch(es) 109, LEDs 110, beeper 111, vibrator 112, and/or display 106. Data may be inputted to monitoring device 101 through button(s)/switch(es) 109, e.g., inputting a maximum distance the monitored unit 102 should be located from monitoring device 101 as discussed below in conjunction with FIG. 2, inputting a command to enter "locate mode" as discussed further below in conjunction with FIG. 3, inputting a command to exit "locate mode" as discussed further below in conjunction with FIG. 6, inputting a command to inform unit 102 to "return to base" as discussed further below in conjunction with FIG. 9, inputting a command to deactivate unit 102 as discussed further below in conjunction with FIG. 10. Output may be received by the user of monitoring device 101 through LEDs 110, beeper 111, vibrator 112 and/or display 106, e.g., outputting an indication that monitored unit 102 is located beyond a pre-selected maximum distance, e.g., 1,400 feet, as discussed further below in conjunction with FIG. 3, outputting an indication that monitoring device 101 has not received a signal at an anticipated time and at an expected frequency from unit 102 for a pre-determined period of time as discussed further below in conjunction with FIG. 3, outputting an option to enter the "locate mode" as discussed further below in conjunction with FIG. 3, outputting a polar plot indicating signal strength and direction of the received signal as discussed further below in conjunction with FIG. 6. It is noted that monitoring device 101 may comprise other types of input/output devices, e.g., alphanumeric characters, not illustrated and that such input/output devices would be known to a person of ordinary skill in the art. It is further noted that embodiments incorporating such input/output devices would fall within the scope of the present invention.

Transmitter/receiver circuit 113 may be configured to transmit information to and receive information from monitored unit 102. Upon activating unit 102 as discussed above, a "seed", a unique identification assigned to unit 102, as well as an identification used to identify monitoring device 101, may be transmitted to monitored unit 102. Further, upon activating unit 102, a "time synchronization" may be transmitted to unit 102. "Time synchronization" may refer to the time that monitoring device 101 transmitted the above information. Each subsequent transmission from monitored unit 102 to monitoring device 101 is a specific time slot synchronized with monitoring device 101. A response from monitoring device 101 resynchronizes the time slot. A "seed" may refer to a multiple bit number, e.g., 16-bit number, used in conjunction with these time slots to select a particular frequency stored in an algorithm, e.g., frequency hopping table. The algorithm may be stored in both monitoring device 101 and monitored unit 102. As discussed below, the algorithm may be stored in a memory unit in monitored unit 102 prior to a customer purchasing monitored unit 102. In one embodiment, the frequencies selected may correspond to frequencies between 902–928 MHz in the license-free ISM band. In one embodiment, system 100 may be configured to implement frequency hopping spread spectrum in the license-free ISM band by selecting 50 hopping frequencies in the algorithm using the seed and time slots as discussed above. It is noted that frequency hopping spread spectrum is known in the art and therefore will not be described in detail for sake of brevity.

In one embodiment, monitoring device 101 may be configured to coordinate multiple monitored units 102 that use the same algorithms, e.g., frequency hop tables, without accidentally activating a different monitored unit 102 than the one intended by ensuring these units 102 are time shifted from each other. The coordination may be accomplished via software stored in memory 107.

Antenna switch 114 may be configured to activate directional antenna 115 to receive transmitted information when monitoring device 101 operates in "locate mode." Locate mode may refer to the mode of operation in which monitored unit 102 increases its rate of transmissions to aid in monitoring device 101 tracking and determining the approximate location of monitored unit 102. For example, the locate mode of operation may be enacted when monitored unit 102 is located beyond a pre-determined maximum distance from monitoring device 101 or when monitored unit 102 has been tampered with as discussed in conjunction with FIGS. 3–6 and 8. In one embodiment, directional antenna 115 may be implemented as a two-element array. Each element may be an omni-directional loop antenna that may be placed about a quarter wavelength apart. Transmitter/receiver circuit 113 may include beam-forming circuitry that combines the signals received from the two-element array to create a cardiod beam pattern. A cardiod beam pattern typically has a high gain lobe in one direction and a deep null in the opposite direction. When tracking monitored unit 102, the null may be utilized to more accurately locate unit 102. Directional antennas are well known to persons of ordinary skill in the art and will therefore not be discussed in further detail for the sake of brevity.

Antenna switch 110 may also be configured to activate an omni directional antenna 116 when monitoring device 101 operates in "monitoring mode." Monitoring mode may refer to the mode of operation in which monitoring device 101 monitors the approximate distance unit 102 is located from monitoring device 101. Omni-directional antennas are well known to persons of ordinary skill in the art and will therefore not be discussed in further detail for the sake of brevity.

It is noted that other features of monitoring device 101 will be discussed further below in conjunction with FIGS. 2–10.

Returning to FIG. 1, monitored unit 102 may comprise a processor 117 coupled to an activation/deactivation sensor 118, a memory 119, a battery 120, LEDs 121, a beeper 122, button(s) and/or switch(es) 123, a tamper sensor 124, and a transmitter/receiver circuit 125. Transmitter/receiver circuit 125 may be coupled to an omni directional antenna 126. It is noted that monitored unit 102 may comprise different circuitry providing the same functionality as discussed herein and that FIG. 1 is illustrative.

Activation/deactivation sensor 118 may be configured to receive a signal to activate or deactivate monitored unit 102 from activation/deactivation unit 104. In one embodiment, activation/deactivation sensor 118 may include an infrared detector and emitter configured to detect and transmit signals in the infrared band from and to monitoring device 101, respectively.

Processor 117 may be configured similarly as processor 103. In one embodiment, memory 119, e.g., non-volatile memory, may store a program for transmitting packets of data at an increased rate during the "locate mode" of operation as described further below in conjunction with FIGS. 4–5. Further, the program stored in memory 119 may perform the steps of enacting the locate mode of operation as described further below in conjunction with FIGS. 4–5. Further, the program stored in memory 119 may include the functionality of notifying monitoring device 101 when monitored unit 102 has been tampered with as described further below in conjunction with FIG. 8. Further, the program stored in memory 119 may include the functionality of notifying the user of monitored unit 102 to return to "base" as described further below in conjunction with FIG. 9. Further, the program stored in memory 119 may include the functionality of deactivating monitored unit 102 as described further below in conjunction with FIG. 10. Processor 117 may be configured to execute the instructions of the programs listed above. It is noted that the steps of the methods performed by the program mentioned above may in an alternative embodiment be implemented in hardware such as in an Application Specific Integrated Circuit (ASIC).

Battery 120 may supply the necessary operating power for the circuitry and components of monitored unit 102. Battery 120 may be a standard carbon or lithium battery, or a rechargeable type battery such as nickel metal hydride (NiMH), nickel cadmium (NiCAD) or lithium-ion.

Monitored unit 102 may comprise input/output devices such as LEDs 121, beeper 122 and button(s)/switch(es) 123. Data may be inputted to monitored unit 102 through button(s)/switch(es) 123. Output may be received by the user of monitored unit 102 through LEDs 121 and beeper 122, e.g., outputting an indication that monitored unit 102 has been tampered with as discussed further below in conjunction with FIG. 8, outputting an indication to return to base as discussed further below in conjunction with FIG. 9. It is noted that monitored unit 102 may comprise other types of input devices as well as output devices, e.g., display, alphanumeric characters, not illustrated and that such input/output devices would be known to a person of ordinary skill in the art. It is further noted that embodiments incorporating such input/output devices would fall within the scope of the present invention.

Tamper sensor 124 may be configured to detect monitored unit 102 being tampered with such as removing monitored unit 102 from an object, e.g., wrist of a child. A more detail description of detecting the tampering of monitored unit 102 is described further below in conjunction with FIGS. 7–8.

Transmitter/receiver circuit 125 may be configured similarly as transmitter/receiver circuit 113. Transmitter/receiver circuit 125 may be configured to transmit information to and receive information from monitoring device 101 via omni directional antenna 126. Omni directional antenna 126 is configured similarly as omni directional antenna 116.

Figure 7:
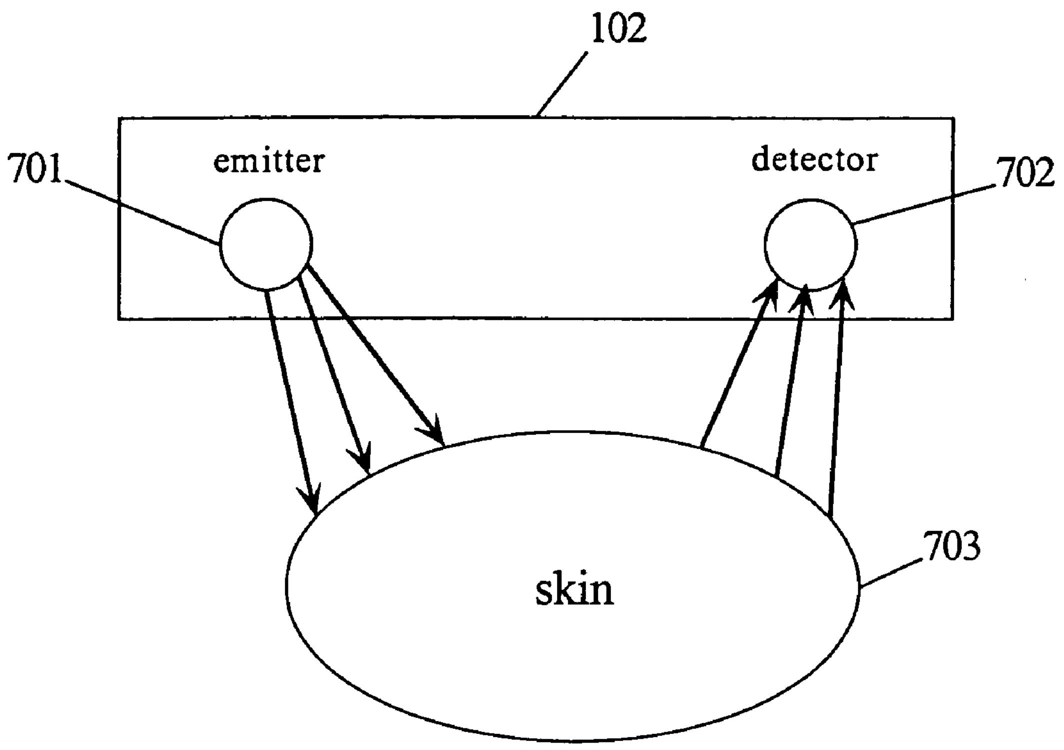
FIG. 7 is an embodiment of the present invention of an infrared reflection mechanism implemented by monitored unit.
Figure 8:
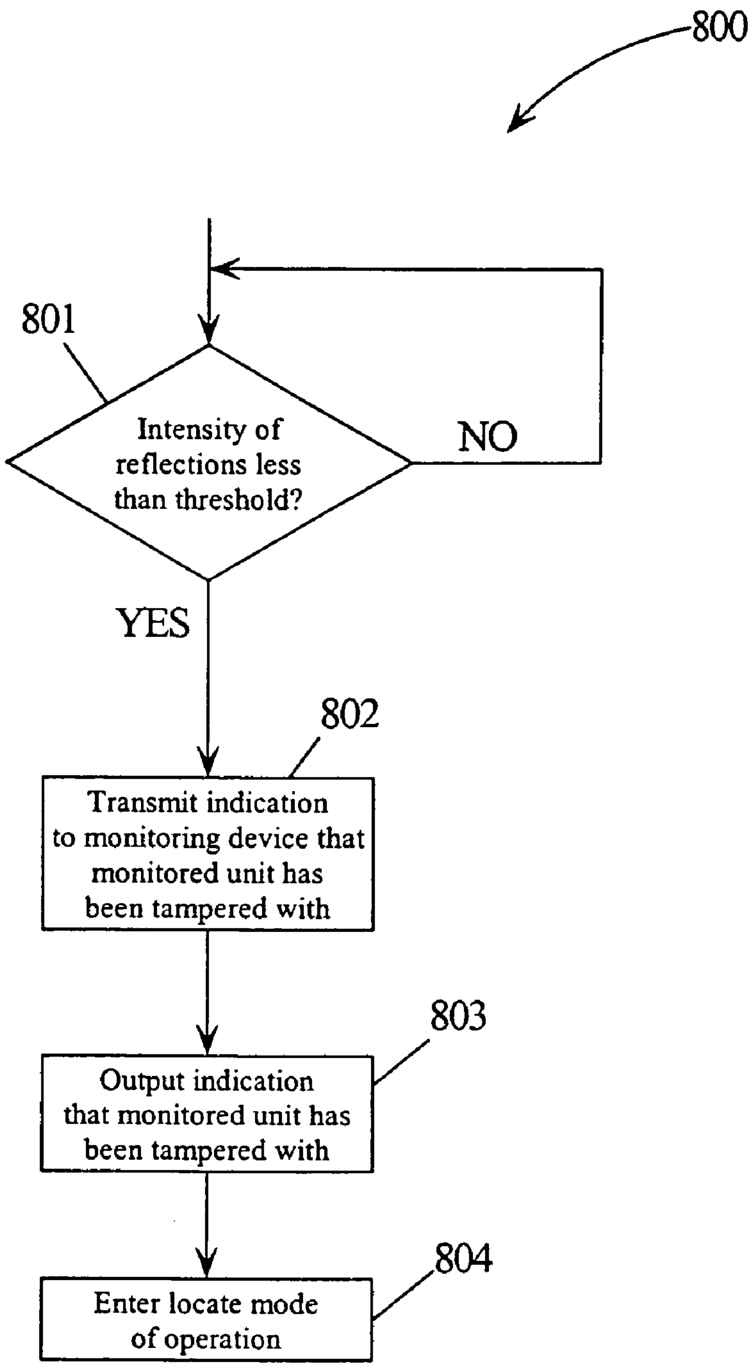
FIG. 8 is a flowchart of a method for detecting the tampering of the monitored unit in accordance with one embodiment of the present invention.
Figure 9:
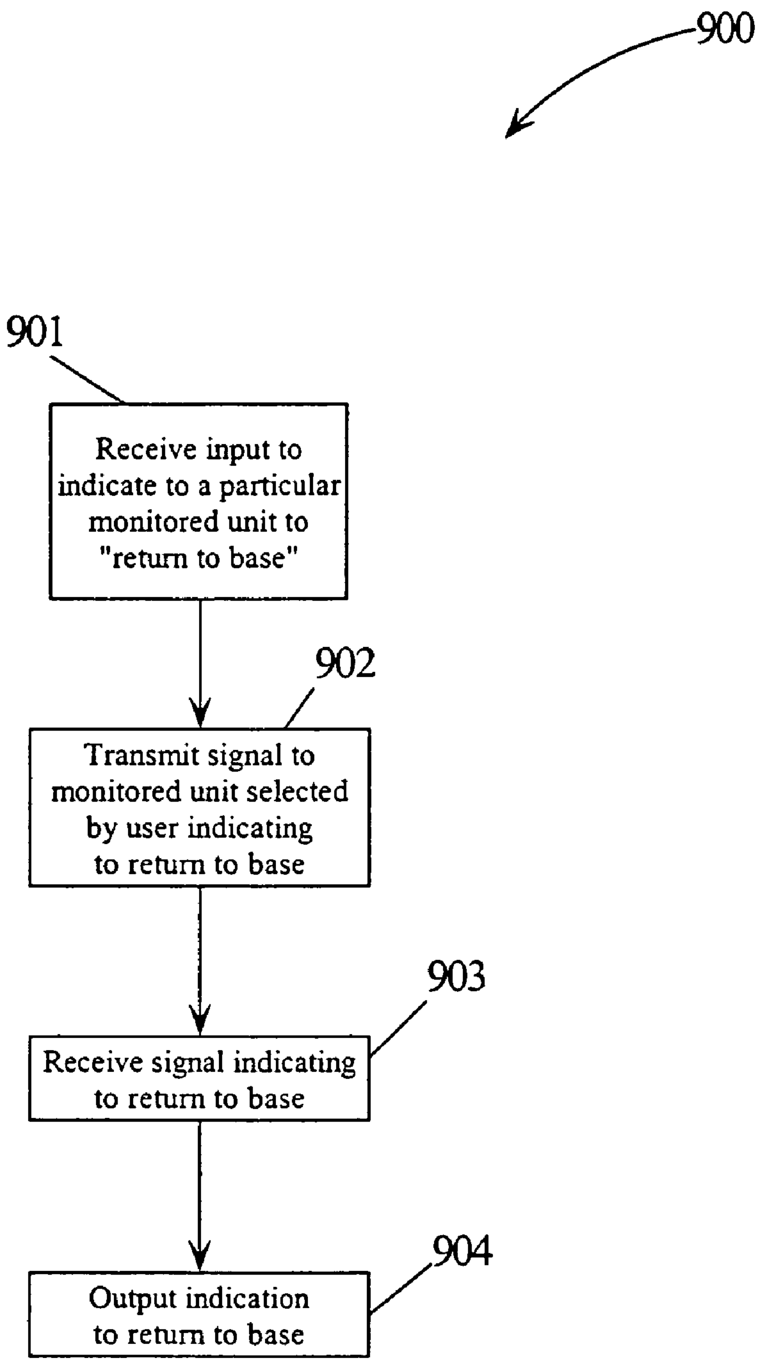
FIG. 9 is a flowchart of a method for requesting the user of the monitored unit to return to base in accordance with one embodiment of the present invention.
Figure 10:
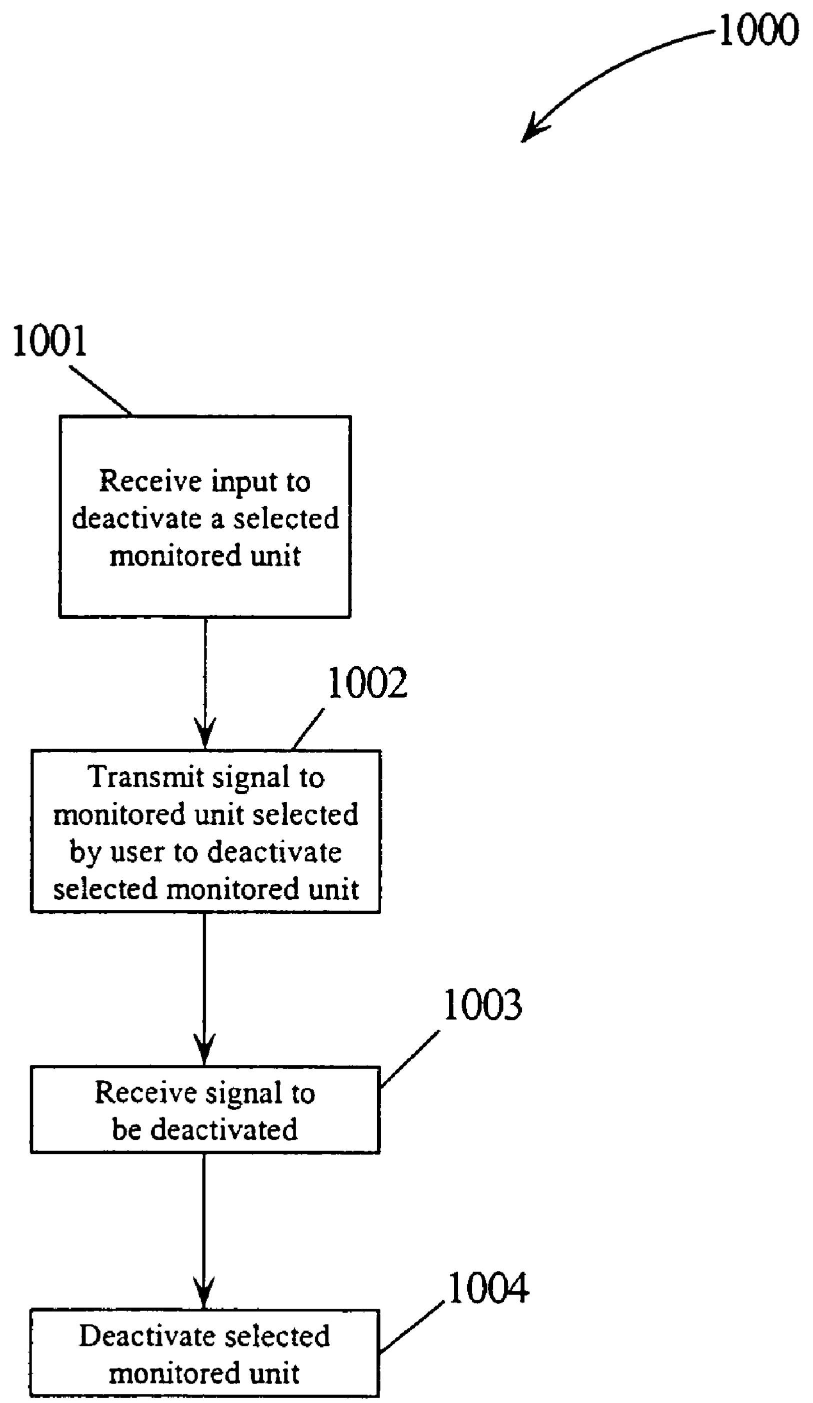
FIG. 10 is a flowchart of a method for deactivating a selected monitored unit in accordance with one embodiment of the present invention.

As stated in the Background Information section, there is a need in the art for a monitoring and locating system that makes it more difficult for a third party, e.g., potential abductor, potential thief, to be able to locate the object, e.g., child, automobile, as well as transmit false information to the monitoring device and/or monitored unit. FIGS. 2–10 describe such a system by implementing frequency hopping thereby making it more difficult for a third party, e.g., potential abductor, potential thief, to be able to locate the object as well transmit false information to the monitoring device and/or monitored unit. A method for activating and setting up monitored unit 102 is described below in conjunction with FIG. 2. A method for monitoring monitored unit 102 is described further below in conjunction with FIG. 3. A method for enacting the "locate mode of operation" on monitored unit 102 from monitored unit's 102 perspective is described further below in conjunction with FIG. 4. An alternative method for enacting the "locate mode of operation" on monitored unit 102 from monitored unit's 102 perspective is described further below in conjunction with FIG. 5. A method for locating monitored unit 102 in the locate mode of operation is described further below in conjunction with FIG. 6. FIG. 7 illustrates tamper sensor 124 of monitored unit 102 configured to detect the removal of monitored unit 102 from its attached object. FIG. 8 is a method for monitored unit 102 for detecting and informing monitoring device 101 if monitored unit 102 was tampered with. FIG. 9 is a method for requesting the user of monitored unit 102 to return to base. FIG. 10 is a method for deactivating monitored unit 102.

Figure 2:
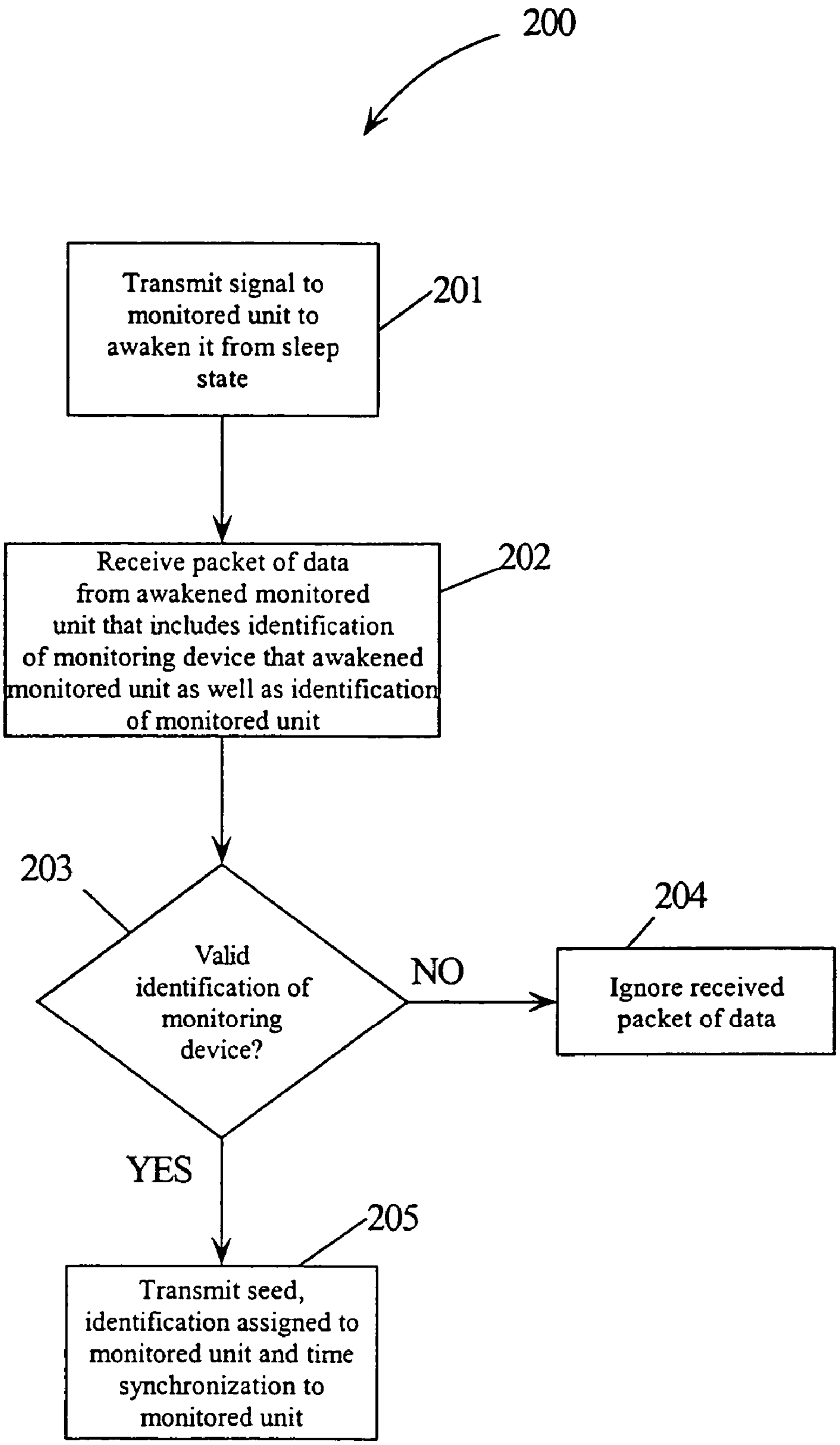
FIG. 2 is a flowchart of a method for activating a monitored unit in accordance with one embodiment of the present invention.

FIG. 2—Method for Activating and Setting Up Monitored Unit

FIG. 2 is a flowchart of one embodiment of the present invention of a method 200 for activating and setting up monitored unit 102.

Referring to FIG. 2, in conjunction with FIG. 1, in step 201, monitoring device 101 transmits a signal in close proximity, e.g., inches, to monitored unit 102 to awaken monitored unit 102 from deactivation/sleep state. That is, in step 201, monitoring device 101 transmits a signal in close proximity, e.g., inches, to monitored unit 102 to activate monitored unit 102. Once monitored unit 102 is activated, monitored unit 102 responds and initiates communication with monitoring device 101 by radio frequency communications. In one embodiment, activation/deactivation unit 104 may transmit a signal to activate monitored unit 102 to be received by activation/deactivation sensor 118 of monitored unit 102. As stated above, activation/deactivation sensor 118 may include an infrared detector and emitter configured to detect and transmit signals in the infrared band from and to monitoring device 101. In one embodiment, activation/deactivation unit 104 may transmit a special pulse sequence that includes the identification of monitoring device 101 via an infrared link to activation/deactivation sensor 118. By monitoring device 101 transmitting the special pulse sequence in close proximity to monitored unit 102, the likelihood of accidentally activating a nearby monitored unit 102 is lessened.

In step 202, monitoring device 101 receives a packet of data from the activated monitored unit 102 that includes the identification of the monitoring device 101 that activated monitored unit 102 as well as the identification of monitored unit 102.

In step 203, monitoring device 101 determines if the identification of a monitoring device 101 is valid. That is, monitoring device 101 determines if the identification of a monitoring device 101 matches its own identification.

If the identification is not valid, then, in step 204, monitoring device 101 ignores the received packet of data. The packet of data may have been intended for another monitoring device 101 that activated this particular monitored unit 102.

If, however, the identification is valid, then, in step 205, monitoring device 101 transmits a seed and a time synchronization, as discussed above, to monitored unit 102. Further, if the identification is valid, monitoring device 101 may transmit an identification assigned to monitored unit 102. Monitoring device 101 may be said to be in "monitoring mode" at this point in time as will be described below in conjunction with FIG. 3.

It is noted that method 200 may include other and/or additional steps that, for clarity, are not depicted. It is noted that method 200 may be executed in a different order presented and that the order presented in the discussion of FIG. 2 is illustrative. It is further noted that certain steps in method 200 may be executed in a substantially simultaneous manner.

Figure 3:
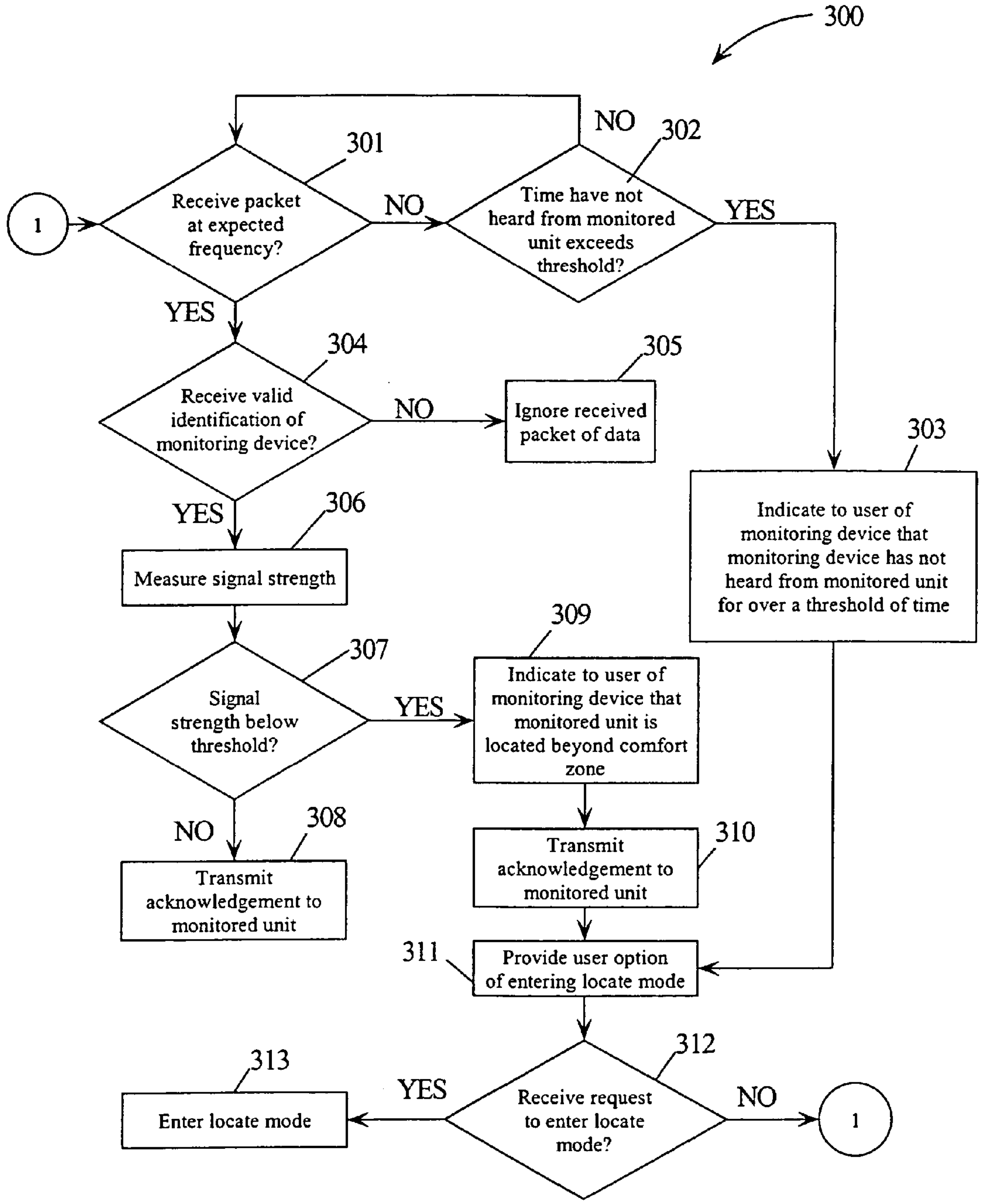
FIG. 3 is a flowchart of a method for monitoring the monitored unit in accordance with one embodiment of the present invention.

FIG. 3—Method for Monitoring Monitored Unit

FIG. 3 is a flowchart of one embodiment of the present invention of a method 300 for monitoring monitored unit 102.

Referring to FIG. 3, in conjunction with FIG. 1, in step 301, monitoring device 101 makes a determination if it received a packet of data from monitored unit 102 at the appropriate time and at the expected frequency. The anticipated time and expected frequency may be determined from an algorithm stored in memory 107 as described above.

If monitoring device 101 did not receive received a packet of data from monitored unit 102 at the appropriate time and at the expected frequency, then, in step 302, monitoring device 101 makes a determination if the time that monitoring device 101 has not heard from monitored unit 102 exceeds a threshold, e.g., three seconds. If the time that monitoring device 101 has not heard from monitored unit 102 does not exceed a threshold, then monitoring device 101 makes a determination if it received a packet of data from monitored unit 102 at an expected time and frequency in step 301.

If, however, the time that monitoring device 101 has not heard from monitored unit 102 exceeds a threshold, then, in step 303, monitoring device 101 outputs an indication, e.g., lights from LEDs 110, a beep from beeper 111, vibration from vibrator 112, to the user of monitoring device 101 that monitoring device 101 has not heard from monitored unit 102 for over a threshold of time.

Returning to step 301 of FIG. 3, if monitoring device 101 did receive a packet of data from monitored unit 102 at the appropriate time and at the expected frequency, then, in step 304, monitoring device 101 makes a determination if the packet of data contains the valid identification of monitoring device 101. Each time monitored unit 102 communicates with monitoring device 101, monitored unit 102 may transmit a packet of data that includes the identification of a monitoring device 101.

If the identification is not valid, then, in step 305, monitoring device 101 ignores the received packet of data. The packet of data may have been intended for another monitoring device 101.

If, however, the identification is valid, then, in step 306, monitoring device 101 measures the signal strength of the received packet of data. In step 307, monitoring device 101 determines if the signal strength is below a threshold.

If the signal strength at or above the threshold, then, in step 308, monitoring device 101 transmits an acknowledgment to monitored unit 102 at a frequency determined by the algorithm, e.g., frequency hopping table, stored in memory 107.

If, however, the signal strength is below the threshold, then, in step 309, monitoring device 101 outputs an indication, e.g., lights from LEDs 110, a beep from beeper 111, vibration from vibrator 112, to the user of monitoring device 101 that monitored unit 102 is located beyond a "comfort zone." The "comfort zone" may refer to a distance determined by the user of monitoring device 101 as to how far monitored unit 102 should be located from monitoring device 101.

In step 309, monitoring device 101 transmits an acknowledgment to monitored unit 102 at a frequency determined by the algorithm, e.g., frequency hopping table, stored in memory 107.

Referring to steps 303 and 310, upon outputting an indication to the user of monitoring device 101 that monitoring device 101 has not heard from monitored unit 102 for over a threshold of time and transmitting an acknowledgment, respectively, monitoring device 101, in step 311, provides the user of monitoring device 101 an option of entering the "locate mode" of operation.

In step 312, monitoring device 101 makes a determination if it received a request to enter the locate mode of operation. If monitoring device 101 does not receive a request to enter the locate mode of operation, then monitoring device 101 makes a determination if it received a packet of data from monitored unit 102 at the appropriate time and frequency in step 301.

If, however, monitoring device 101 does receive a request to enter the locate mode of operation, then, in step 313, monitoring device 101 enters the locate mode of operation. A description of different methods of enacting the locate mode of operation on monitored unit 102 is provided below in conjunction with FIGS. 4–5. A description of monitoring device 101 locating monitored unit 102 during the locate mode of operation is provided below in conjunction with FIG. 6.

It is noted that method 300 may include other and/or additional steps that, for clarity, are not depicted. It is noted that method 300 may be executed in a different order presented and that the order presented in the discussion of FIG. 3 is illustrative. It is further noted that certain steps in method 300 may be executed in a substantially simultaneous manner.

Figure 4:
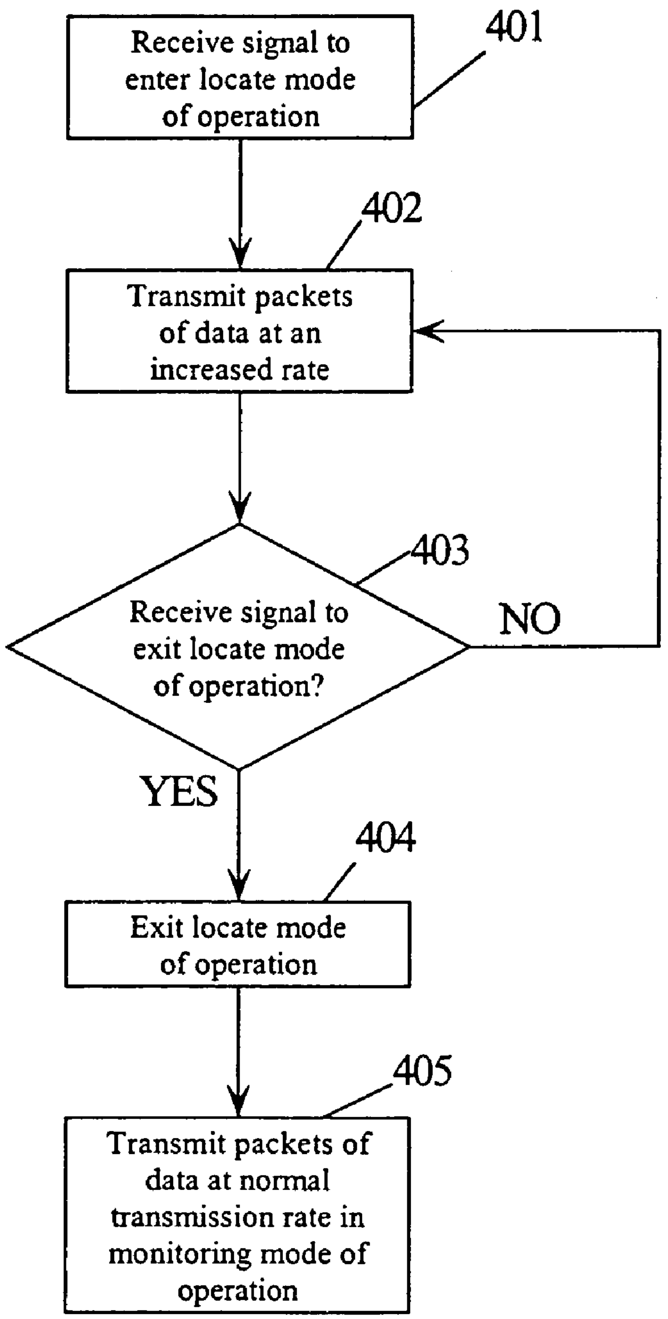
FIG. 4 is a flowchart of a method for enacting the locate mode of operation on the monitored unit in accordance with one embodiment of the present invention.

FIG. 4—Method for Enacting the Locate Mode of Operation on Monitored Unit

FIG. 4 is a flowchart of one embodiment of the present invention of a method 400 for enacting the locate mode of operation on monitored unit 102 from monitored unit's 102 perspective.

Referring to FIG. 4, in conjunction with FIG. 1, in step 401, monitored unit 102 receives a signal to enter the locate mode of operation from monitoring device 101. In step 402, monitored unit 102 transmits packets of data at an increased rate at expected frequencies according to an algorithm, e.g., frequency hopping table, stored in memory 119. For example, monitored unit 102 may transmit packets of data at expected frequencies every 1 second during the monitoring mode of operation. During the locate mode of operation, monitored unit 102 may transmit packets of data at expected frequencies every 200 milliseconds.

In step 403, monitored unit 102 determines if it received a signal from monitoring device 101 to exit the locate mode of operation. If not, then monitored unit 102 continues to transmit packets of data at an increased rate at expected frequencies in step 402.

If, however, monitored unit 102 receives a signal from monitoring device 101 to exit the locate mode of operation, then monitored unit 102 exits the locate mode of operation in step 404. In step 405, monitored unit 102 transmits packets of data at a normal rate, e.g., 1 transmission per second, at expected frequencies according to an algorithm, e.g., frequency hopping table, stored in memory 119. That is, monitored unit 102 enters the monitoring mode of operation and transmits packets of data at the normal rate of transmission.

It is noted that method 400 may include other and/or additional steps that, for clarity, are not depicted. It is noted that method 400 may be executed in a different order presented and that the order presented in the discussion of FIG. 4 is illustrative. It is further noted that certain steps in method 400 may be executed in a substantially simultaneous manner.

Figure 5:
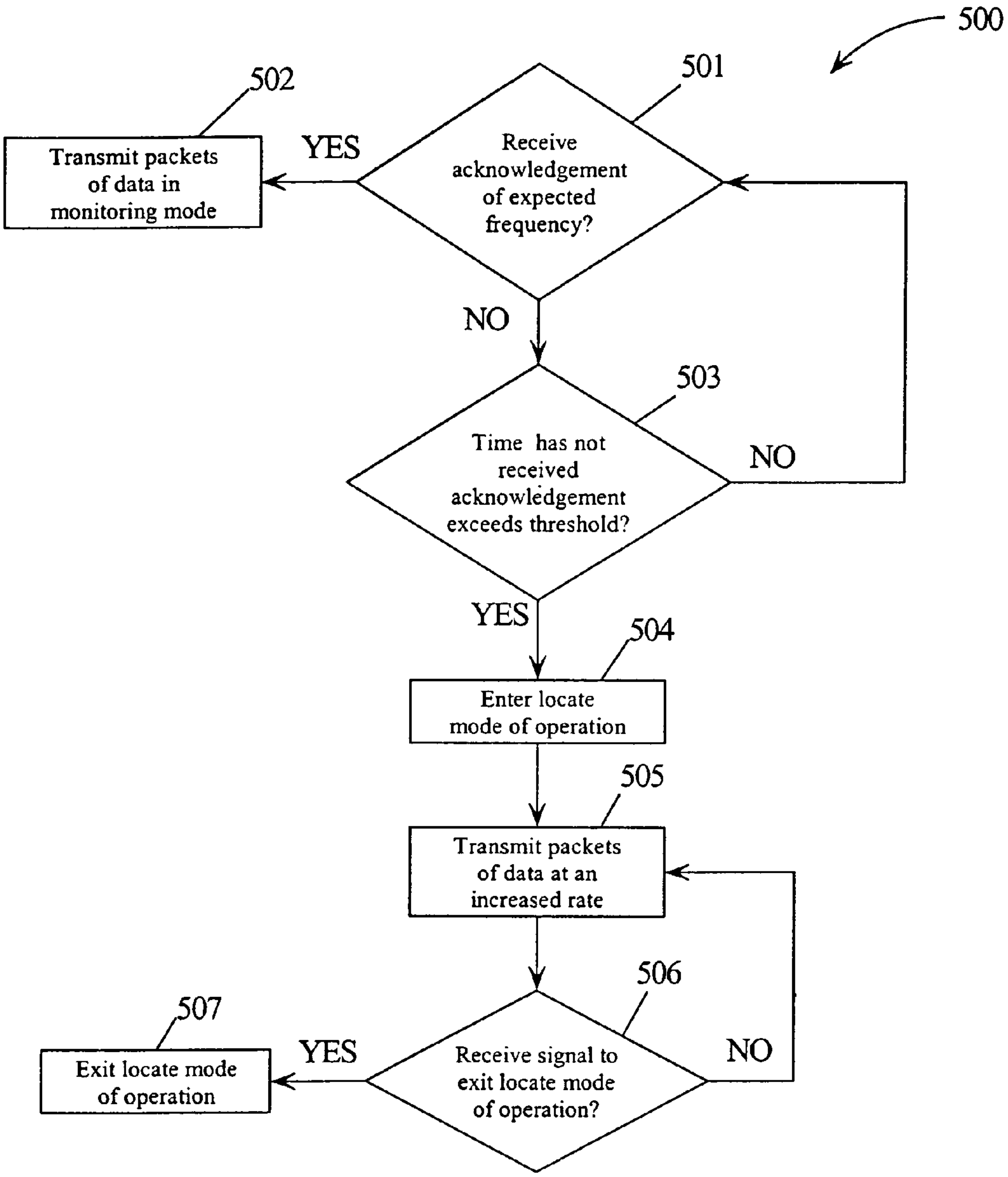
FIG. 5 is a flowchart of an alternative method for enacting the locate mode of operation on the monitored unit in accordance with one embodiment of the present invention.

FIG. 5—Alternative Method for Enacting the Locate Mode of Operation on Monitored Unit FIG. 5 is a flowchart of an alternative embodiment of the present invention of a method 500 for enacting the locate mode of operation on monitored unit 102 from monitored unit's 102 perspective.

Referring to FIG. 5, in conjunction with FIG. 1, in step 501, monitored unit 102 determines if it received an acknowledgment at the appropriate time from monitoring device 101 at the expected frequency according to the algorithm, e.g. frequency hopping table, stored in memory 119.

If monitored unit 102 received an acknowledgment at the appropriate time from monitoring device 101 at the expected frequency, then, in step 502, monitored unit 102 transmits packets of data to monitoring device 101. In one embodiment, the packets of data may include the identification of monitoring device 101 and the identification of monitored unit 102.

If, however, monitored unit 102 did not receive an acknowledgment at the appropriate time from monitoring device 101 at the expected frequency, then, in step 503, monitored unit 102 determines if the time that monitored unit 102 has not received the acknowledgment exceeds a time threshold, e.g., three seconds.

If the time that monitored unit 102 has not received the acknowledgment does not exceed the time threshold, then, in step 501, monitored unit 102 determines if it received an acknowledgment at the next appropriate time from monitoring device 101 at the next expected frequency according to the algorithm, e.g. frequency hopping table, stored in memory 119.

If, however, the time that monitored unit 102 has not received the acknowledgment does exceed the time threshold, then, in step 504, monitored unit 102 enters the locate mode of operation from monitoring device 101. In step 505, monitored unit 102 transmits packets of data at an increased rate at expected frequencies according to an algorithm, e.g., frequency hopping table, stored in memory 119. For example, monitored unit 102 may transmit packets of data at expected frequencies every 1 second during the monitoring mode of operation. During the locate mode of operation, monitored unit 102 may transmit packets of data at expected frequencies every 200 milliseconds.

In step 506, monitored unit 102 determines if it received a signal to exit the locate mode of operation from monitoring device 101. If monitored unit 102 does not receive a signal to exit the locate mode of operation from monitoring device 101, then, in step 505, monitored unit 102 transmits packets of data at an increased rate at expected frequencies according to an algorithm, e.g., frequency hopping table, stored in memory 119. If, however, monitored unit 102 does receive a signal to exit the locate mode of operation from monitoring device 101, then, in step 507, monitored unit 102 exits the locate mode of operation.

It is noted that method 500 may include other and/or additional steps that, for clarity, are not depicted. It is noted that method 500 may be executed in a different order presented and that the order presented in the discussion of FIG. 5 is illustrative. It is further noted that certain steps in method 500 may be executed in a substantially simultaneous manner.

Figure 6:
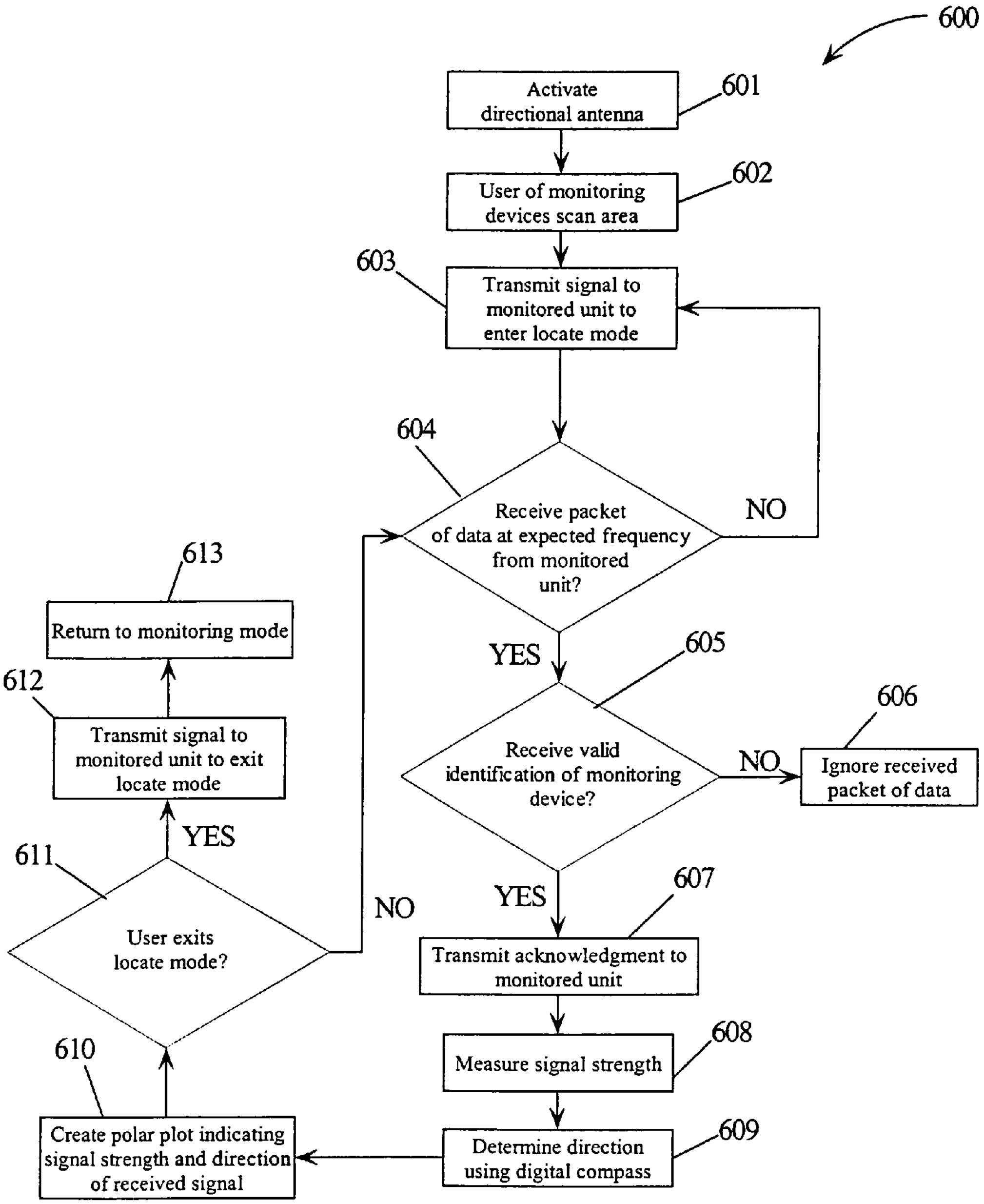
FIG. 6 is a flowchart of a method for locating the monitored unit in the locate mode of operation in accordance with one embodiment of the present invention.

FIG. 6—Method for Locating Monitored Unit in the Locate Mode of Operation

FIG. 6 is a flowchart of one embodiment of the present invention of a method 600 for locating monitored unit 102 in the locate mode of operation.

Referring to FIG. 6, in conjunction with FIG. 1, in step 601, monitoring device 101 activates directional antenna 115. In one embodiment, monitoring device 101 may activate directional antenna 115 via antenna switch 114.

In step 602, the user of monitoring device 101 may scan over a 360 degree field with monitoring device 101.

In step 603, monitoring device 101 transmits a signal to monitored unit 102 at the expected time and frequency using the algorithm stored in memory 107 to enter the locate mode of operation. In step 604, monitoring device 101 determines if it received a packet of data at the appropriate time and at the expected frequency from monitored unit 102.

If monitoring device 101 did not receive a packet of data from monitored unit 102 at the appropriate time and at the expected frequency, then, in step 603, monitoring device 101 transmits a signal to monitored unit 102 at the expected frequency using the algorithm stored in memory 107 to enter the locate mode of operation.

If, however, monitoring device 101 did receive a packet of data from monitored unit 102 at the appropriate time and at the expected frequency, then, in step 605, monitoring device 101 determines if it received a valid identification. As stated above, each time monitored unit 102 communicates with monitoring device 101, monitored unit 102 may transmit a packet of data that includes the identification of a monitoring device 101.

If the identification is not valid, then, in step 606, monitoring device 101 ignores the received packet of data. The packet of data may have been intended for another monitoring device 101.

If, however, the identification is valid, then, in step 607, monitoring device 101 transmits an acknowledgment to monitored unit 102 at the expected frequency determined by the algorithm stored in memory 107.

In step 608, monitoring device 101 measures the strength of the received packet of data. In step 609, monitoring device 101 determines the direction of the signal using digital compass 105.

In step 610, monitoring device 101 creates a polar plot, which is displayed on display 106, indicating both the signal strength and direction of the received signal.

In step 611, monitoring device 101 determines if the user of monitoring device 101 exits the locate mode of operation. In one embodiment, the user of monitoring device 101 may exit the locate mode of operation by inputting to monitoring device 101, such as by button(s)/switch(es) 109, a command to exit the locate mode of operation.

If the user does not exit the locate mode of operation, then, in step 604, monitoring device 101 determines if it received a packet of data at the anticipated time and at the expected frequency from monitored unit 102.

If, however, the user did exit the locate mode of operation, then, in step 612, monitoring device 101 transmits a signal to monitored unit 102 to exit out of the locate mode of operation. In step 613, monitoring device 101 returns to the monitoring mode of operation.

It is noted that method 600 may include other and/or additional steps that, for clarity, are not depicted. It is noted that method 600 may be executed in a different order presented and that the order presented in the discussion of FIG. 6 is illustrative. It is further noted that certain steps in method 600 may be executed in a substantially simultaneous manner.

FIG. 7—Wrist Infrared Reflector

FIG. 7 illustrates an embodiment of the present invention of tamper sensor 124 (FIG. 1) including an infrared reflection mechanism to detect tampering of monitored unit 102.

Referring to FIG. 7, FIG. 7 illustrates tamper sensor 124 comprising an infrared emitter 701 and an infrared detector 702. Tamper sensor 124 may be located on a surface of monitored unit 102. For example, infrared emitter 701 and infrared detector 702 may be located on the side of monitored unit 102 touching the surface of an object, e.g., skin of a child. Monitored unit 102 may be configured to periodically generate a sequence of pulses on emitter 701 and detect the strength of the reflections of the emitted pulses from the surface of the object on detector 702. The intensity of the returned reflections may correlate the distance monitored unit 102 is located from the surface of the object, e.g., skin of the child. The infrared reflection mechanism may detect tampering of monitored unit 102 as explained below in conjunction with FIG. 8.

FIG. 8—Method for Detecting Tampering of Monitored Unit

FIG. 8 is a flowchart of one embodiment of the present invention of a method 800 for detecting the tampering of monitored unit 102 using the infrared reflection mechanism of FIG. 7.

Referring to FIG. 8, in conjunction with FIGS. 1 and 7, in step 801, monitored unit 102 determines if the intensity of the reflections is less than a threshold. As stated above, detector 702 may be configured to detect the intensity of the infrared signals reflected off the surface of an object, e.g., skin of a child, that were emitted from emitter 701.

If the intensity of the reflections is less than a threshold, then monitored unit 102 continues to determine if the intensity of the reflections is less than a threshold in step 802.

If, however, the intensity of the reflections is equal to or greater than the threshold, then, in step 802, monitored unit 102 transmits an indication to monitoring device 101 that monitored unit 102 has been tampered with. In step 803, an indication, e.g., alarm, is outputted by monitored unit 102. For example, an alarm may be outputted via beeper 122 or a speaker (not shown) on monitored unit 102.

In step 804, monitored unit 102 enters the locate mode of operation. It is noted that the locate mode of operation is discussed above and that the description will not be repeated herein for the sake of brevity.

It is noted that method 800 may include other and/or additional steps that, for clarity, are not depicted. It is noted that method 800 may be executed in a different order presented and that the order presented in the discussion of FIG. 8 is illustrative. It is further noted that certain steps in method 800 may be executed in a substantially simultaneous manner.

FIG. 9—Method for Requesting the User of Monitored Unit to Return to Base

FIG. 9 is a flowchart of one embodiment of the present invention of a method 900 for requesting the user of monitored unit 102 to return to base, i.e., return to a designated place such as home.

Referring to FIG. 9, in conjunction with FIG. 1, in step 901, monitoring device 101 receives an input to indicate to a particular monitored unit 102 to return to base. For example, monitoring device 101 may receive an input from the user of monitoring device 101 to indicate to a particular monitored unit 102 to return to base via button(s)/switch(es) 109. Return to base may refer to returning to a designated site such as home for a child.

In step 902, monitoring device 101 transmits a signal to monitored unit 102, selected by the user of monitoring device 101, indicating to return to base.

In step 903, monitored unit 102 receives the transmitted signal from monitoring device 101 indicating to return to base.

In step 904, monitored unit 102 outputs an indication to the user of monitored unit 102 to return to base. For example, an indication to return to base may be outputted via beeper 122 or a speaker (not shown) on monitored unit 102.

It is noted that method 900 may include other and/or additional steps that, for clarity, are not depicted. It is noted that method 900 may be executed in a different order presented and that the order presented in the discussion of FIG. 9 is illustrative. It is further noted that certain steps in method 900 may be executed in a substantially simultaneous manner.

FIG. 10—Method for Deactivating a Selected Monitored Unit

FIG. 10 is a flowchart of one embodiment of the present invention of a method 1000 for deactivating a selected monitored unit 102.

Referring to FIG. 10, in conjunction with FIG. 1, in step 1001, monitoring device 101 receives an input to deactivate a selected monitored unit 102. For example, monitoring device 101 may receive an input from the user of monitoring device 101 to deactivate a selected monitored unit 102 via button(s)/switch(es) 109.

In step 1002, monitoring device 101 transmits a signal to monitored unit 102, selected by the user of monitoring device 101, to deactivate the selected monitored unit 102.

In step 1003, monitored unit 102 receives the transmitted signal from monitoring device 101.

In step 1004, monitored unit 102 becomes deactivated.

It is noted that method 1000 may include other and/or additional steps that, for clarity, are not depicted. It is noted that method 1000 may be executed in a different order presented and that the order presented in the discussion of FIG. 10 is illustrative. It is further noted that certain steps in method 1000 may be executed in a substantially simultaneous manner.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A system, comprising:

a monitored unit attached to an object, wherein said monitored unit comprises:

a memory unit operable for storing a computer program operable for determining if said monitored unit has been tampered with;

a processor coupled to said memory unit;

an emitter coupled to said processor, wherein said emitter is configured to emit infrared signals to a skin of an individual; and a detector coupled to said processor, wherein said detector is configured to receive reflections of said emitted infrared signals from said skin;

wherein said processor, responsive to said computer program, comprises:

circuitry operable for determining if an intensity of said reflections of said emitted infrared signals is less than a threshold; and circuitry operable for transmitting an indication that said monitored unit has been tampered with if said intensity of said reflections of said emitted infrared signals is less than said threshold.

2. The system as recited in claim 1, wherein said processor further comprises:

circuitry operable for transmitting signals at an increased rate.

3. The system as recited in claim 2 further comprises:

a monitoring device configured to monitor and locate said monitored unit, wherein said monitoring device comprises:

a memory unit operable for storing a computer program operable for monitoring and locating said monitored unit; and a processor coupled to said memory unit, wherein said processor, responsive to said computer program, comprises:

circuitry operable for receiving said indication that said monitored unit has been tampered with;

circuitry operable for receiving a transmitted signal; and circuitry operable for measuring a signal strength of said transmitted signal;

circuitry operable for determining a direction of said transmitted signal; and circuitry operable for creating a polar plot indicating said signal strength and said direction of said transmitted signal.

* * * * *